Patented July 8, 1941

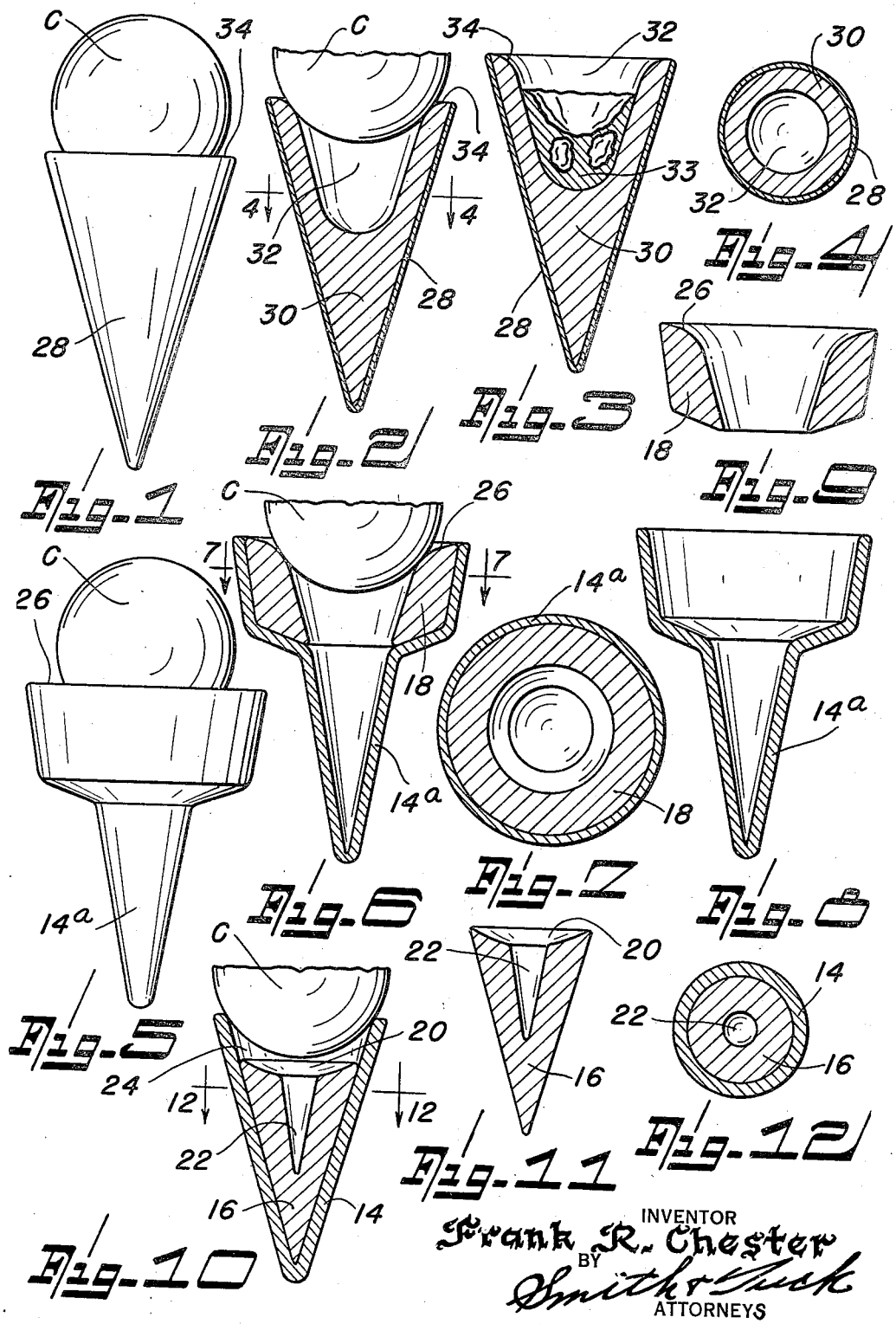

2,248,448

UNITED STATES PATENT OFFICE 2,248,448

ICE CREAM SUNDAE CONE

Frank R. Chester, Seattle, Wash.

Application January 2, 1940, Serial No. 312,101

7 Claims. (Cl. 99—89)

My present invention relates to the confectionary field, and more particularly to an ice cream sundae cone.

My invention consists essentially in providing an insert, or filler, for use in an ice cream cone, supported by the usual hard-baked cone structure. By cone is meant the edible containers, usually of cone shape, in which ice cream is sold for immediate consumption. The insert is formed of edible material of a very porous character. Thus, the natural fruit flavorings, such as crushed pineapple, or any of the natural flavoring syrups used in ice cream sundaes, may be either placed in the cone and the ice cream inserted; or the ice cream may be put in its usual place in a specially formed cone, and as the natural fruit or fruit flavors are poured over the ice cream, the flavoring will be absorbed by the very porous lining of the cone. In this way, an ice cream cone can be provided which will, in effect, give the buyer an ice cream sundae. The liquid of the flavoring will be absorbed in the porous material and will not, therefore, spill or run either in carrying or as the cone is being eaten. With this arrangement it will naturally follow that, as the cone is eaten and the ice cream normally descends into the cone, the person eating the cone will obtain, along with the ice cream, the flavoring which has been used, but will get it by eating the porous material with the end result similar, for instance, to eating an ice cream sundae with wafers.

The principal object of my present invention is, therefore, to provide a non-spillable, ice cream sundae cone in which natural fruit flavors, syrups, and the like can be used.

A further object of my invention is to provide means whereby the person eating an ice cream cone can enjoy all the advantages of an ice cream sundae with the same convenience to himself, and to the merchant selling it, as experienced in handling the ordinary ice cream cone.

A further object of my invention is to provide means whereby, with a neutral flavored absorbent lining, or insert, a merchant may provide an ice cream cone sundae using the natural flavor so that one type of cone and cone insert make it possible to serve cones using any of the standard flavors he may have available.

A further object of my present invention is to provide means whereby the present standard types of ice cream cones can, by the insertion of an absorptive filler, be readily converted into an ice cream cone sundae.

Other and more specific objects will be apparent from the following description taken in connection with the accompanying drawing, wherein Figure 1 is a side elevation of one form of cone, with a scoop of ice cream in position thereon, embodying my present invention.

Figure 2 is a vertical, sectional view through the cone structure of Figure 1.

Figure 3 is a vertical, sectional view similar to Figure 2, without the ice cream in place, but showing the normal resting place of the natural fruit flavoring, in this instance a berry flavoring.

Figure 4 is a cross-sectional view taken along the line 4—4 of Figure 2.

Figure 5 is a side elevation of a modified form of cone structure of a type now generally used when enlarged servings of ice cream are sold.

Figure 6 is a vertical, sectional view through the cone structure of Figure 5.

Figure 7 is a cross-sectional view taken along the line 7—7 of Figure 6.

Figure 8 is a vertical, sectional view through the cone of Figures 5 and 6, but showing the porous insert removed therefrom.

Figure 9 is a vertical, cross-sectional view of the porous insert used with the cone of Figure 8.

Figure 10 is a vertical, sectional view illustrating the form which, at present, is believed to be the preferred embodiment of my invention.

Figure 11 is a vertical, sectional view through the conical, porous insert used in the cone structure of Figure 10.

Figure 12 is a cross-sectional view taken along the line 12—12 of Figure 10.

Referring to the drawing, throughout which like reference characters indicate like parts, 14 designates the body of an ordinary, hard baked cake, ice cream cone. These cones have been in use for many years, and the methods of baking the same are well known. They provide a readily edible ice cream container which has the property of not becoming soft as the ice cream melts and gradually finds its way into the apex of the cone. This structure is essential for the successful functioning of my present ice cream sundae cone. This form is illustrated particularly in Figure 10. In Figures 5, 6, 7, and 8 I have illustrated a different form of cone in which the lower portion is truly conical, but the upper portion is formed with an ice cream retaining ledge of increased diameter. These cones are normally intended for the serving of large scoops full of ice cream. In each of these forms I provide an insert as 16 or 18 which is best made of material that is absorbent, having a structure similar to slightly sweetened, sponge cake, or certain types of sugar frosting, but, preferably of neutral flavor, and otherwise edible.

In my preferred form shown in Figures 10, 11, and 12, I provide the conical insert 16 shaped to fit inside the normal or conventional ice cream cone. The upper end of this insert may be dished inwardly, as indicated at 20, and preferably provided with an inner, cone-shaped cavity, 22. The overall length of the insert should be considerably less than the cone length with which it is used; substantially after the proportions shown in Figure 10. In using this form of cone, it is intended that the dispenser first place the cone filler 16 inside cone 14 and then inside of this place the desired natural flavor. This flavoring, it will be observed, will run down into the interior cavity 22. The ice cream C is then placed on the cone in the usual manner. Then, as shown in Figure 2, the ice cream seals the upper portion of the cone, leaving the cavity 24 which should be substantially filled with the flavoring material, such as crushed fruit, or shredded or grated fruit and the attendant syrups and juices, or any of the prepared syrups. When the customer eats the cone of Figure 10, the ice cream will gradually lower itself into the cone and the liquids of the flavoring will tend to soften the absorptive material 16 so that in each bite the customer will get ice cream, the natural or customary flavoring as used on sundaes, and a small amount of cake. As the eating of the cone progresses this combination of ice cream, flavoring, and cake will be carried out until the cone is entirely consumed.

In the form of cone shown in Figures 5 to 9, inclusive, it is intended that the insert 18 will be placed in the conventional cone 14—a and the ice cream placed in the cone after the showing of Figures 5 and 6. The flavoring will then be poured over the ice cream ball. The solid material will come to rest on the upper surface, as 26, of the insert 18, and the liquid will be absorbed in the porous material of the insert. Here again the consumer will have, in effect, a complete ice cream sundae except that it is in cone form so that it may be easily eaten without danger of any of the liquid, which will be absorbed in filler 18, running down the cone or being spilled on the person of the consumer.

In Figures 1 to 4, inclusive, I have illustrated a further modification of my ice cream sundae cone in that—where transportation is not a problem, and it is not essential to have the cones nest, one inside the other—it is possible to bake a cone, after the showing of Figure 1 through 4, having a hard, non-absorptive, outer shell 28 with an interior 30 which will have the same porous form as inserts 16 or 18. With this cone structure, the method of serving may be either that described for the cone of Figure 10 or the cone of Figure 5. In other words, the flavoring may be placed inside the cavity 32 as is illustrated at 33 and then the ice cream ball be placed on top of the cone as was done in the case of the cone of Figure 10 or, by virtue of the fact that the filler 30 extends up to the upper end of the cone, syrup or crushed fruit may be poured over the ice cream ball. Some experience will be required in this, but if sufficient care is employed by the vender the solid fruits will be retained either on the ice cream ball or on the upper portion as 34 of the insert 30 and the liquid, as before, will be absorbed in the absorbent filler 30 of the cone. As the form and shape of baked cake ice cream containers often vary somewhat from the shapes illustrated, it is desired to point out that my same arrangement of having an absorbing lining for a hard cake container may be successfully employed in any of the various edible containers observed.

It is believed that my ice cream cone may be truly considered an ice cream sundae cone in that the purchaser of the cone may have his favorite ice cream and in addition may have his favorite flavoring syrup, or crushed fruit, just as he would have if he ordered a sundae. The cake, of which the cone is made, serves the same purpose as the wafers which are normally served with ice cream sundaes, and in this way the customer has a very enjoyable confection, and the vender has the same sales advantages as though he were vending ordinary cones. All that he requires, in addition to the ordinary equipment and stock necessary to sell ice cream cones, would be the additional containers for the fruits or flavoring syrups. Following the practice in serving sundaes, ground nuts can be placed either in the body of the cones of Figure 3 or 10, or poured on top of the ice cream ball in the cone of Figures 6 through 8, so that, in effect, a convenient portable ice cream sundae is provided.

Whereas I have, throughout my specification, referred to cones or containers for ice cream as being baked from a flour base, cake material, my arrangement will work very satisfactorily with many other types of material, such as the egg-white cones, baskets, or cups, and certain of the gelatin products and like materials, which will make a satisfactory edible container by merely molding or otherwise forming the material without the necessity of baking the same.

The foregoing description and the accompanying drawing are believed to clearly disclose a preferred embodiment of my invention, but it will be understood that this disclosure is merely illustrative and that such changes in the invention may be made as are fairly within the scope and spirit of the following claims.

Having thus fully described my invention, what I claim as new and desire to secure by Letters Patent is:

1. An ice cream container having an edible, hard baked outer cake shell and an insert for said container made of porous, edible material having liquid absorption properties.

2. An ice cream container having an edible, hard baked, outer cake shell and an insert for said container made of porous, edible material, said porous insert having at its upper end a ring of absorbent material disposed around a central opening.

3. An ice cream container having an edible, hard baked, outer cake shell, and an insert for said container made of porous, edible material having liquid absorption properties, said insert having a ring-like upper portion having a fruit collecting surface.

4. An ice cream cone having an edible, hard baked outer cake shell and an insert for said cone made of porous, edible material having liquid absorption properties.

5. An ice cream container having an edible, firm outer shell and an insert for said container made of absorbent, edible material, said insert having at its upper end a ring of absorbent material disposed around a central opening.

6. An ice cream container having a hard, edible, outer shell, and an insert for said container made of edible material having liquid absorbing properties, said insert having a ring-like upper portion having a fruit collecting surface.

7. An ice cream container including a relatively hard edible cone, a conical filler within the cone consisting of porous absorbent edible material, said filler having a depressed upper face within the shell and a downwardly extending cavity for flavoring material, said cone adapted to receive an ice-cream closure seated in the upper edge of the cone to prevent displacement of the flavoring material from the depression.

FRANK R. CHESTER.